(12) United States Patent
Cordell et al.

(10) Patent No.: US 10,839,801 B2
(45) Date of Patent: Nov. 17, 2020

(54) CONFIGURATION FOR REMOTE MULTI-CHANNEL LANGUAGE INTERPRETATION PERFORMED VIA IMAGERY AND CORRESPONDING AUDIO AT A DISPLAY-BASED DEVICE

(71) Applicant: Language Line Services, Inc., Monterey, CA (US)

(72) Inventors: Jeffrey Cordell, Carmel, CA (US); Lindsay D'Penha, Carmel, CA (US); Julia Berke, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 104 days.

(21) Appl. No.: 16/219,798

(22) Filed: Dec. 13, 2018

(65) Prior Publication Data

US 2020/0193980 A1   Jun. 18, 2020

(51) Int. Cl.
| | |
|---|---|
| *G10L 15/22* | (2006.01) |
| *G10L 15/00* | (2013.01) |
| *G06T 13/80* | (2011.01) |
| *G10L 21/10* | (2013.01) |

(52) U.S. Cl.
CPC ............. *G10L 15/22* (2013.01); *G06T 13/80* (2013.01); *G10L 15/005* (2013.01); *G10L 21/10* (2013.01); *G10L 2015/225* (2013.01)

(58) Field of Classification Search
CPC ......... G06F 40/40; G06F 40/58; G10L 15/005
See application file for complete search history.

(56) References Cited

U.S. PATENT DOCUMENTS

| | | | | |
|---|---|---|---|---|
| 7,216,072 B2 * | 5/2007 | Kasai | ...................... | G06F 40/47 704/8 |
| 7,505,893 B2 * | 3/2009 | Mizutani | ................. | G06F 40/58 704/2 |
| 7,835,914 B2 * | 11/2010 | Mizutani | ................. | G10L 15/22 704/277 |
| 9,213,693 B2 * | 12/2015 | D'Penha | ................. | G06F 40/47 |
| 2010/0121629 A1 * | 5/2010 | Cohen | ..................... | G10L 13/00 704/2 |
| 2010/0198579 A1 * | 8/2010 | Cunnington | ........ | H04L 12/1822 704/3 |
| 2016/0170970 A1 * | 6/2016 | Lindblom | ............... | G06F 40/40 704/3 |

(Continued)

*Primary Examiner* — Daniel Abebe
(74) *Attorney, Agent, or Firm* — Patent Ingenuity, P.C.; Samuel K. Simpson (57) ABSTRACT

A configuration is implemented to receive, with a processor from a customer care platform, a request for spoken language interpretation of a user query from a first spoken language to a second spoken language. The first spoken language is spoken by a user situated at a display-based device that is remotely situated from the customer care platform. The user query is sent from the display-based device by the user to the customer care platform. The configuration performs, at a language interpretation platform, a first spoken language interpretation of the user query from the first spoken language to the second spoken language. Further, the configuration transmits, from the language interpretation platform to the customer care platform, the first spoken language interpretation so that a customer care representative speaking the second spoken language understands the first spoken language being spoken by the user.

10 Claims, 9 Drawing Sheets

(56) References Cited

U.S. PATENT DOCUMENTS

2016/0246781 A1\* 8/2016 Cabot .................... G16H 80/00
2016/0328387 A1\* 11/2016 Boutcher ................ G06F 40/40
2017/0357639 A1\* 12/2017 Zamor .................... G10L 15/26

\* cited by examiner

CONFIGURATION FOR REMOTE MULTI-CHANNEL LANGUAGE INTERPRETATION PERFORMED VIA IMAGERY AND CORRESPONDING AUDIO AT A DISPLAY-BASED DEVICE

BACKGROUND

1. Field

This disclosure generally relates to the field of language interpretation. More particularly, the disclosure relates to interpretation from a first human-spoken language to a second human-spoken language.

2. General Background

Conventional configurations allow users speaking different human-spoken languages to communicate with each other via a human interpreter, or a machine interpreter, of such human-spoken languages. For example, a first human user may speak a first human-spoken language (i.e., a language that is traditionally spoken by a group of people originating from a particular geographic location, country, or region) such as English, whereas a second human user may speak a second human-spoken language such as Spanish.

A customer care environment is a context in which the aforementioned human-spoken language interpretation is often needed. For instance, a user speaking a language other than English, which is referred to herein as a limited English proficiency user ("LEP"), may call a remote customer service center and be connected with a customer care representative who only speaks English. For example, the LEP may have a question about his or her insurance policy, call a customer care phone number corresponding to the LEP's insurance company, and be routed to an English-speaking customer care representative to answer the LEP's question. To help facilitate an understanding of the communication for both the LEP and the English-speaking customer care representative, the customer service center will often route the phone call to a third-party language interpretation service.

After receiving the communication, the third-party language interpretation service will often utilize a human interpreter to perform consecutive language interpretation. For example, the LEP speaks in Spanish while the English-speaking customer care representative and the human interpreter wait, both the LEP and the English-speaking customer care representative wait while the human interpreter utters an English translation of the Spanish spoken by the LEP, the English-speaking customer care representative responds in English while the LEP and the human interpreter wait, and both the English-speaking customer care representative and the LEP wait while the human interpreter utters a Spanish translation of the English spoken by the English-speaking customer care representative.

In other words, such consecutive dialogue is awkward and cumbersome, at best, for each of the LEP, English-speaking customer care representative, and the human interpreter. As a result, current configurations inefficiently utilize computing resources to provide language interpretation.

SUMMARY

A configuration is implemented to receive, with a processor from a customer care platform, a request for spoken language interpretation of a user query from a first spoken language to a second spoken language. The first spoken language is spoken by a user situated at a display-based device that is remotely situated from the customer care platform. The user query is sent from the display-based device by the user to the customer care platform.

The configuration performs, at a language interpretation platform, a first spoken language interpretation of the user query from the first spoken language to the second spoken language. Further, the configuration transmits, from the language interpretation platform to the customer care platform, the first spoken language interpretation so that a customer care representative speaking the second spoken language understands the first spoken language being spoken by the user. Additionally, the configuration receives, at the language interpretation platform from the customer care platform, a customer care response in the second spoken language. The configuration also performs, at the language interpretation platform, a second spoken language interpretation of the customer care response from the second spoken language to the first spoken language.

Further, the configuration generates, with the processor, audio data and image data that each correspond to the second spoken language interpretation of the customer care response. The configuration then transmits, with the processor, the audio data and the image data to the customer care platform so that the customer care platform sends the audio data and the image data to the display-based device for consumption at the display-based device without rendering of audio data or image data in the first spoken language.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A configuration for remote multi-channel language interpretation is provided. The configuration allows for simultaneous, rather than consecutive, communication between a first user speaking a first human spoken language (e.g., Spanish) and a second user (i.e., human and/or machine) speaking a second human spoken language (e.g., Spanish).

For instance, the first user may participate in a live communication via a display-based device (e.g., smartphone, tablet device, desktop computer, laptop computer, virtual reality ("VR") headset, augmented reality ("AR") glasses, smart watch, etc.). The first user may view imagery (e.g., avatar, emoji, unenhanced picture, enhanced picture, etc.) associated with the second user during the live communication; further such imagery may be manipulated, via video and/or audio, to appear to speak with the first user in the language of the first user. The second user may or may not be able to view the first user. Accordingly, the first user is able to communicate with the second user in a manner such that the first user only has to view and/or listen to the second user in the language of the first user, without viewing or hearing utterances in the second language. As a result the communication between the first user and the second user may occur in a natural, seamless manner that does not require the users to wait for interpretations before speaking, thereby resulting in simultaneous communication.

Figure 1:
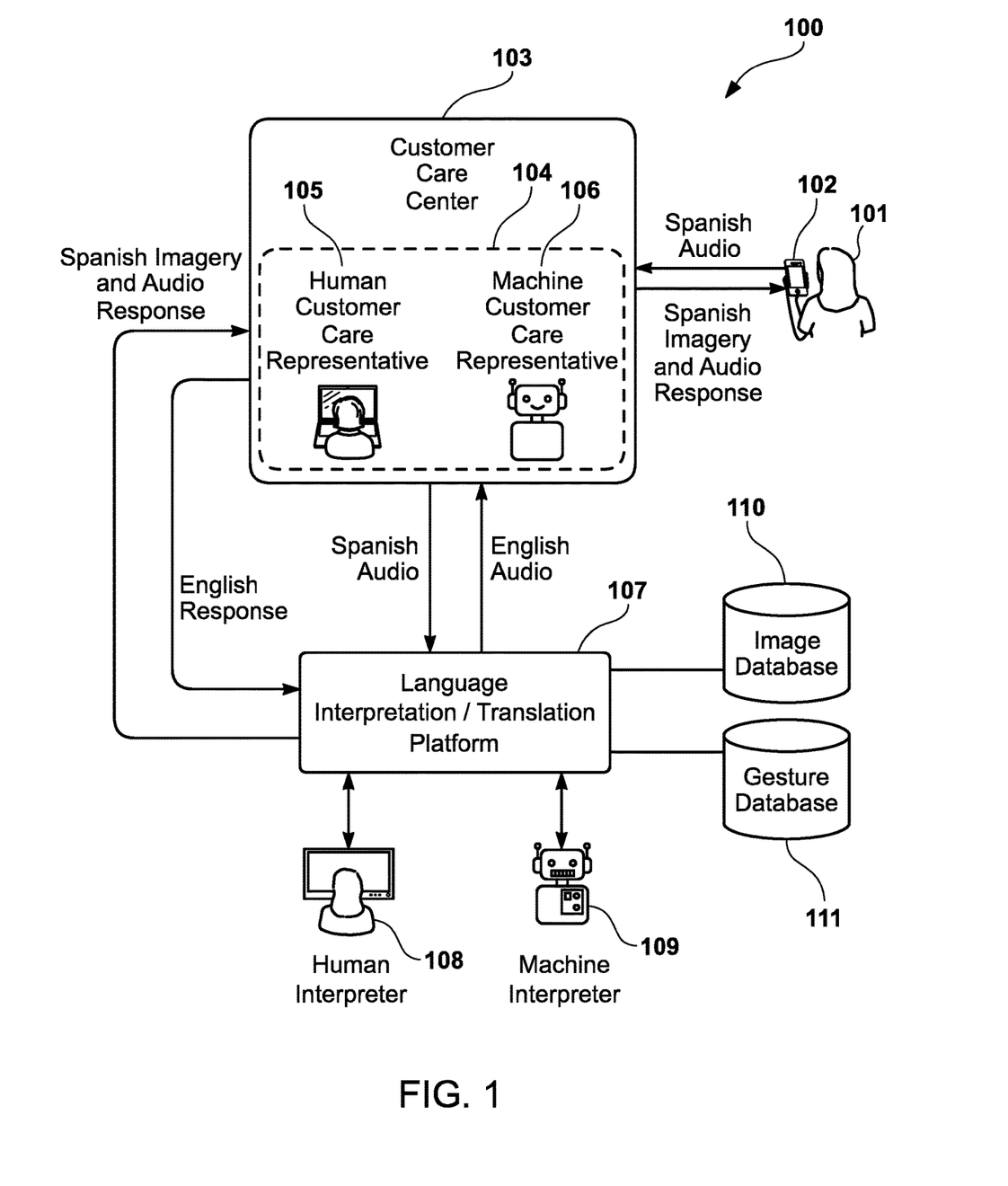
FIG. 1 illustrates a remote multi-channel language interpretation system.

FIG. 1 illustrates a remote multi-channel language interpretation system 100. An example of an LEP user 101 is illustrated as using a display-based device 102 to communicate with a customer care center 103. For instance, the customer care center 103 may be a call center for an insurance company that provides customer service regarding users' insurance policies. (An insurance company is provided only as an example since other types of product and/or service providers may be associated with the customer care center 103.)

In one embodiment, the LEP user 101 speaks his or her native language (e.g., Spanish) into the display-based device 102. The display-based device 102 may have audio reception/transmission capabilities (e.g., via a telephony module, video conferencing module, etc.). Further, the display-based device 102 transmits the audio received from the LEP user 101 to the customer care center 103. (The customer care center 103 is illustrated only for illustrative purposes since a variety of services other than customer care may be provided by an entity in communication with the LEP user 101.) For example, the LEP user 101 may have a question with respect to his or her insurance policy.

At the customer care center 103, a group of customer care representatives 104 (including, but not limited to, human customer care representatives 105 and/or machine customer care representatives 106) are available to answer questions from the LEP user 101 and other users. In one embodiment, the group of customer care representatives 104 is only proficient in a language (e.g., English) other than that of the LEP user 101. Accordingly, the customer care center 103 forwards the Spanish audio to a language interpretation platform 107, which may have a human interpreter 108, a machine interpreter 109, or a combination thereof that may translate the Spanish audio into English audio. The language interpretation platform 107 then forwards the English audio to the customer care center 103 so that the one of the customer care representatives 104 may understand the question asked by the LEP user 101.

Further, the customer care representative 104 may respond to the question in English. The customer care center platform 103 sends the English response to the language interpretation platform 107 so that the language interpretation platform 107 may translate the response into Spanish. Additionally, the language interpretation platform 107 may generate, or modify, imagery that corresponds to the audio response. For example, the imagery may embody a professional spokesperson, an iconic avatar for a brand or company, a user-selected emoji, etc. The language interpretation platform 107 may manipulate the imagery (e.g., via lip synchronization) so that the imagery appears to be vocalizing and/or expressing the translated audio response.

In one embodiment, the language interpretation platform 107 is in operable communication with an image database 110 and/or a gesture database 111. For example, the language interpretation platform 107 may retrieve lip images, which match particular words in a given language (e.g., Spanish), to then manipulate the character displayed by the display-based device 102. In other words, the image database 110 may have categorize particular images (e.g., lip movements) according to particular words, phrases, and/or expressions in the given language. As another example, the language interpretation platform 107 may retrieve may retrieve gestures (e.g., hand expressions, head tilting, etc.) from the gesture database 111 according to particular words, phrases, and/or expressions in the given language. The manipulation is not limited to be being performed by the language interpretation platform 107. For example, the customer care center platform 103 may perform the image manipulation, or a software application accessed by the display-based device 102 may perform the manipulation.

In another embodiment, manipulation of imagery is unnecessary because the images of intended lip movements, gestures, etc. are stored in the imagery database 110 and/or the gesture database 111. In other words, multiple images (each having a particular expression, gesture, etc.) are stored in the databases 110 and/or 111. Accordingly, the language interpretation platform 107 retrieves each image, with the corresponding feature, and presents a sequence of images rather than manipulating an image of the character.

Accordingly, the imagery may be available for the consumption of live voice interpretation, live video-based interpretation, and/or machine interpretation. In contrast with previous configurations in which the LEP user 101 would hear the customer care representative 104 speaking English during the language interpretation, the language interpretation platform 107 allows for the LEP user 101 to be speaking with the customer care representative 104 only in Spanish. The LEP user 101 does not have to wait for an interpreter to perform an interpretation during the conversation because, from the perspective of the LEP user 101, an interpretation is not even being performed; all that is heard and/or displayed via the display-based device 102 is Spanish.

The aforementioned simultaneous interpretation configuration improves the functioning of a computer by reducing computing resource requirements. For example, prior configurations required extensive data storage of multiple language pair libraries (e.g., English/Spanish, English/French, Spanish/French, etc.). When a user called into a customer care center, the corresponding library would need to be uploaded (e.g., for a machine interpreter to perform, or assist a human interpreter, with a language interpretation). Instead of having to expend significant computing resources on storing and processing such libraries, the simultaneous interpretation configuration allows for live, on-the-fly, interpretation as needed, thereby improving computer processing efficiency.

Figure 2:
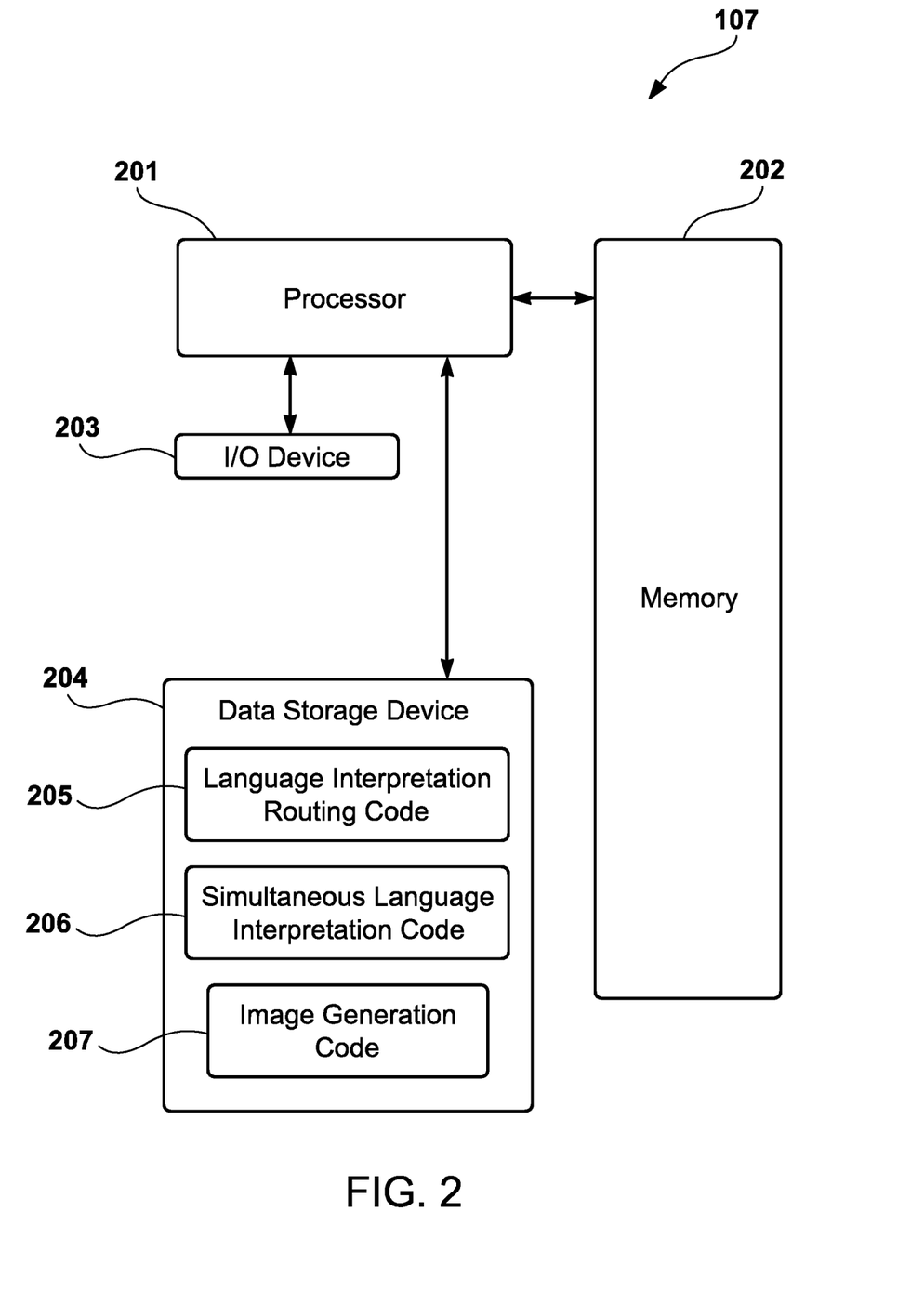
FIG. 2 illustrates the internal components of the language interpretation platform illustrated in FIG. 1.

FIG. 2 illustrates the internal components of the language interpretation platform 107 illustrated in FIG. 1. A processor 201 is in operable communication with a memory device 202, one or more input/output ("I/O") devices 203, and a data storage device 204. Further, the processor 201 loads various code (e.g., language interpretation routing code 205, simultaneous language interpretation code 206, and imagery generation code 207) from the data storage device 204 into the memory device 202.

The processor 201 utilizes the language interpretation routing code 205 to route the language interpretation request to an available language interpreter (e.g., human interpreter 108 or machine interpreter 109).

Further, the processor 201 utilizes the simultaneous language interpretation code 206 to insert audio, corresponding to the language of the LEP user 101 (e.g., Spanish), into the response sent to the display-based device 102. Accordingly, the LEP user 101 does not have to hear the audio of the interpretation performed by the available language interpreter performing the language interpretation from Spanish into English, but rather can hear only the Spanish translation of the response.

Additionally, the processor 201 utilizes the imagery generation code 207 to generate an image-based character (e.g., iconic figure, character associated with a brand, picture of a human interpreter, enhanced picture of a human interpreter, emoji, etc.). The processor 201 may manipulate images to correspond to the audible, live language interpretation.

In other words, the language interpretation platform 107 may provide seamless communication, both visually and audibly, in the language of the LEP user 101 such that the LEP user 101 is insulated from the language interpretation process. From the perspective of the LEP user 101, a language interpretation has not even occurred. The LEP user 101 simply communicates in his or her respective, native language (e.g., Spanish) and is able to both view and hear responses in that same language.

Figure 3A:
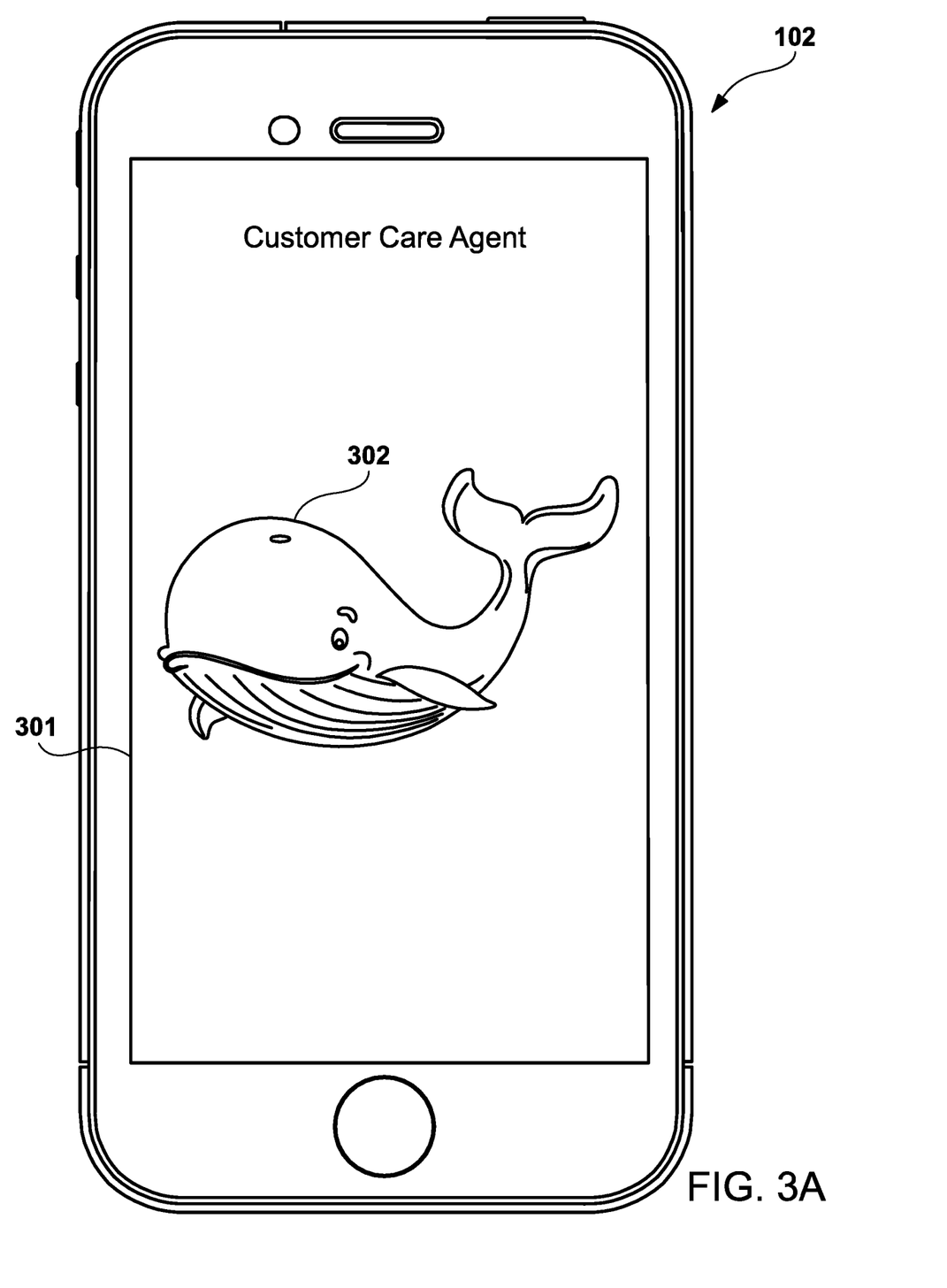
FIG. 3A illustrates a brand-associated character having a lip movement corresponding to the translated response in the language of the LEP user.
Figure 3B:
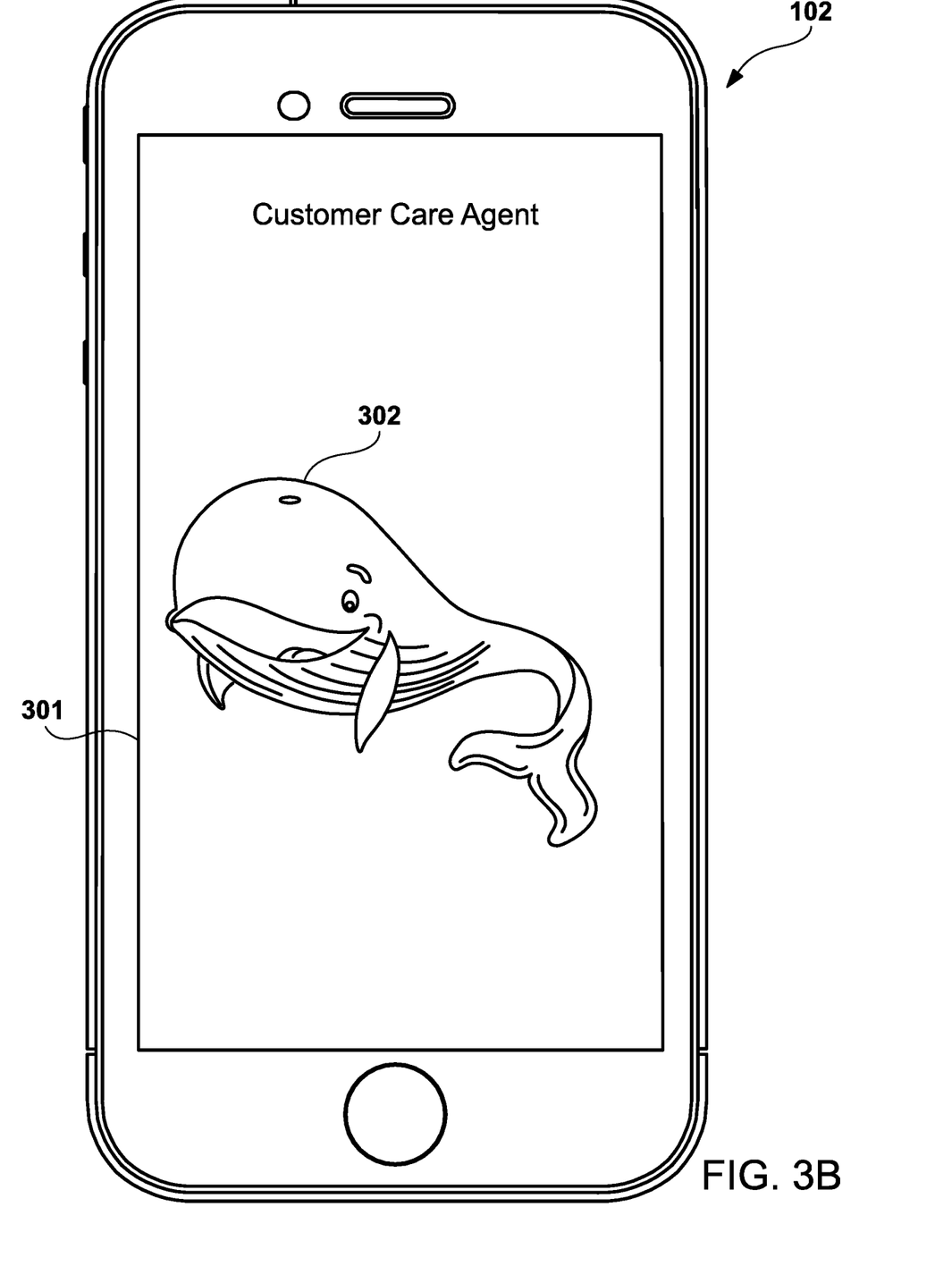
FIG. 3B illustrates an image-based manipulation of the brand-associated character illustrated in FIG. 3A.

FIGS. 3A and 3B illustrate an example of a brand-associated character 302 that is displayed during the communication between the LEP user 101 and the customer care representative 104 illustrated in FIG. 1. For example, FIG. 3A illustrates the display-based device 102 illustrated in FIG. 1 displaying an image of the brand-associated character 302 on a display screen of the display-based device 102. For instance, the brand-associated character 302 may be an image of a character (e.g., whale) that is advertised (e.g., via television, Internet, etc.) as being associated with a particular product and/or service provider.

In the example provided in FIG. 3A, the brand-associated character 302 has a lip movement corresponding to the translated response in the language of the LEP user 101 (e.g., lips being closed to represent a pause). As the audio data of the language interpretation is provided to the display-based device 102, the video manipulations (e.g., lip movements, hand expressions, etc.) are synchronized, in real-time or substantially real-time, to correspond to the audio portion. In one embodiment, the language interpretation platform 107 provides a synchronized data feed for both the video manipulations and the corresponding audio. In another embodiment, the language interpretation platform 107 provides two separate data feeds and corresponding time codes for one, or both, of the feeds that allow the display-based device 102 to perform the synchronization of the video and audio, in real-time, or in substantially real-time.

Further, in one embodiment, a sequence of images, each having the particular manipulation, is provided to the display-based device 102. In another embodiment, an image of the brand-associated character 302, or other image, is provided to the display-based device 102 via a software application. Further, image manipulation data and corresponding audio data may be sent to the display-based device 102. For example, the image manipulation data may instruct the display-based device 102 to manipulate the pre-stored image according to the manipulation instructions.

FIG. 3B illustrates an image-based manipulation of the brand-associated character 302 illustrated in FIG. 3A. The lips are manipulated to correspond to the audible language interpretation. Further, gestures of various anatomical parts are also illustrated to correspond to the meaning of the interpretation/translation.

Figure 4A:
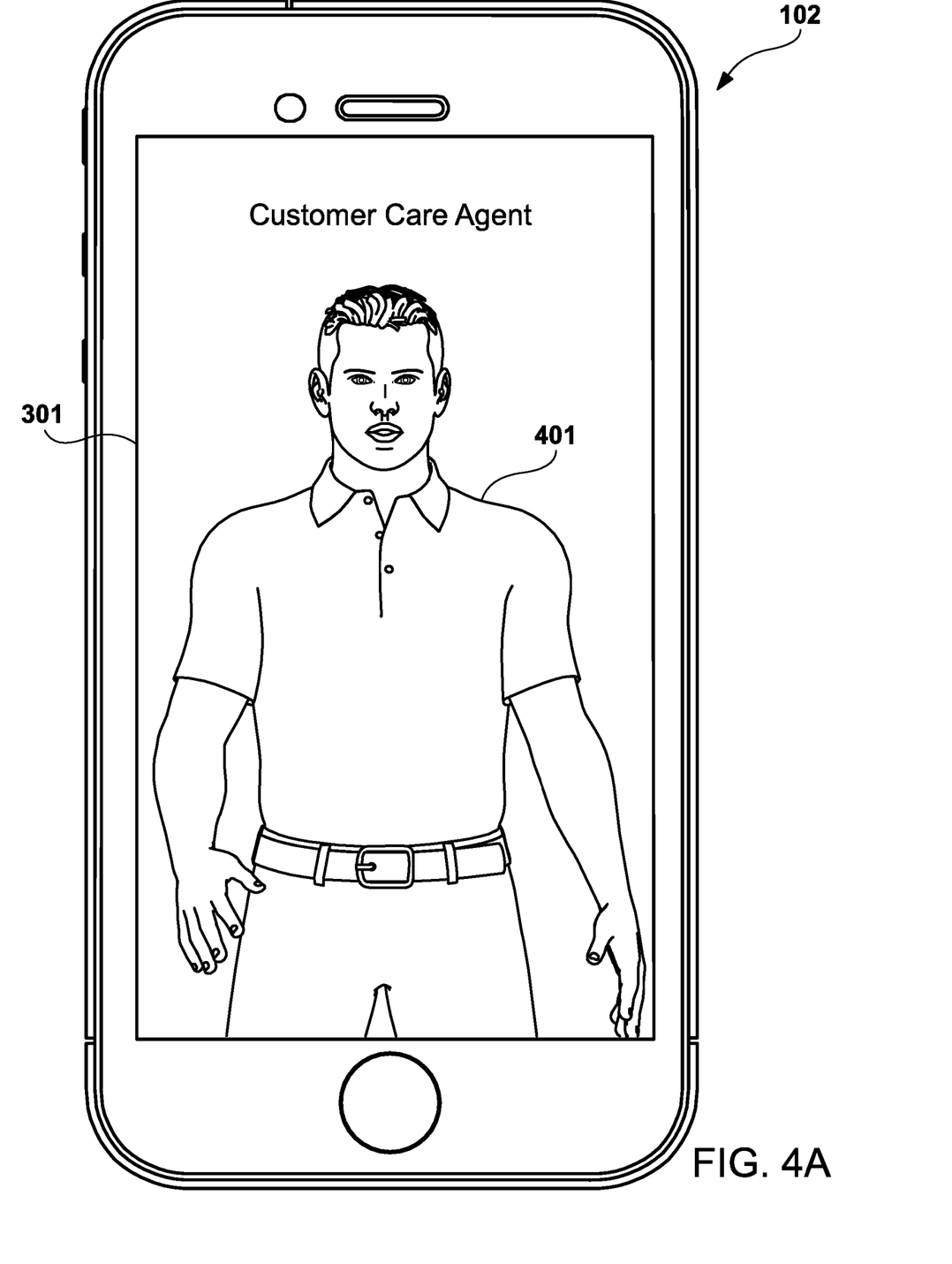
FIG. 4A illustrates a human character having a lip movement corresponding to the translated response in the language of the LEP user.
Figure 4B:
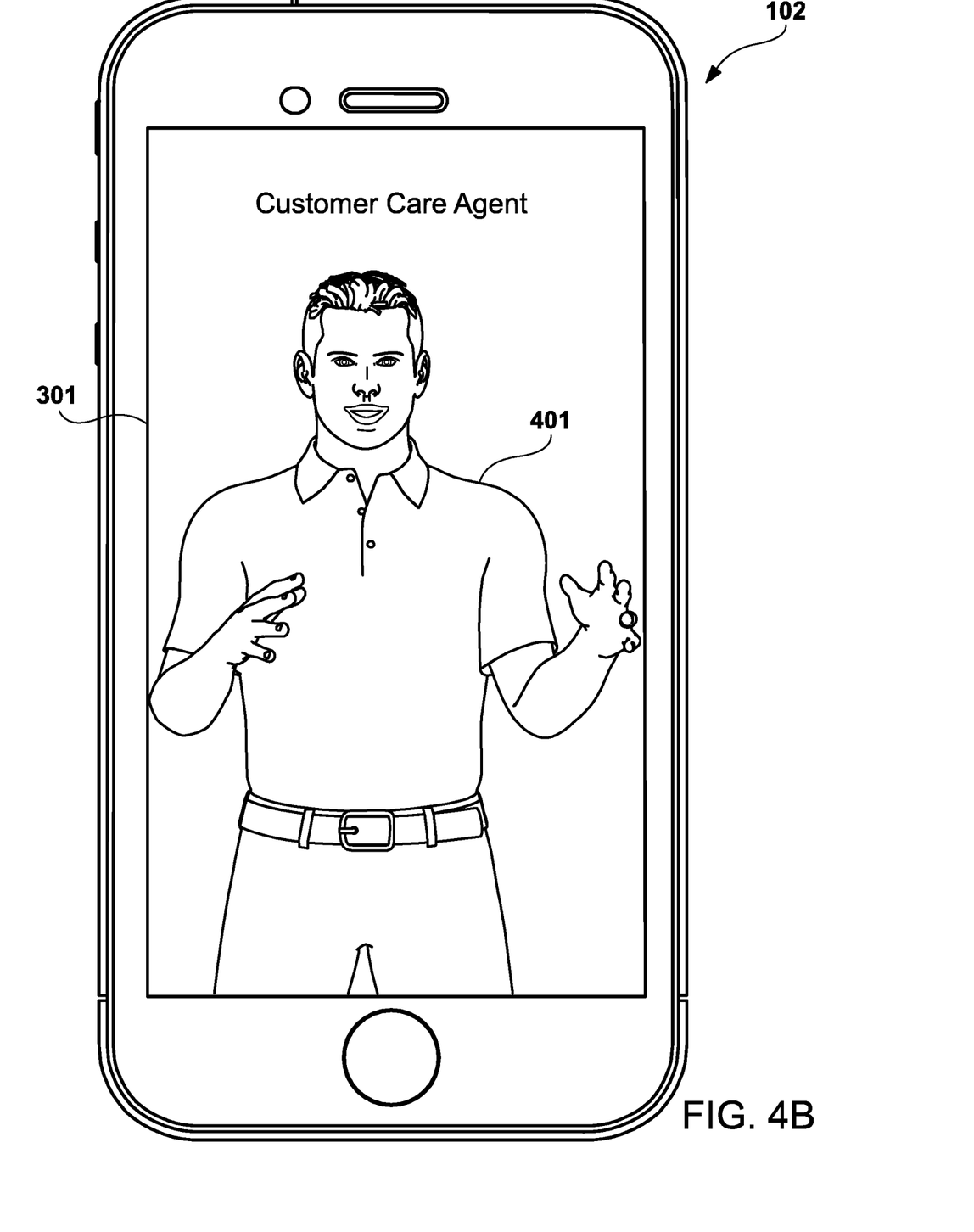
FIG. 4B illustrates an image-based manipulation of the human character illustrated in FIG. 4B.

As an alternative, the customer care agent 104 may be displayed as a human. FIGS. 4A and 4B illustrate an example of a human character 402 that is displayed during the communication between the LEP user 101 and the customer care representative 104 illustrated in FIG. 1. The human character 402 may be a brand-associated character (e.g., an image capture, or enhanced image capture, of a human representative appearing in advertisements for a product or service, a computer generated animation of the human representative, a cartoon version of the human representative, etc.). In the example provided in FIG. 4A, the human character 402 has a lip movement corresponding to the translated response in the language of the LEP user 101. Further, FIG. 4B illustrates an image-based manipulation of the human character 402 illustrated in FIG. 4B to correspond to the audio for a subsequent part of the interpretation/translation.

Figure 5A:
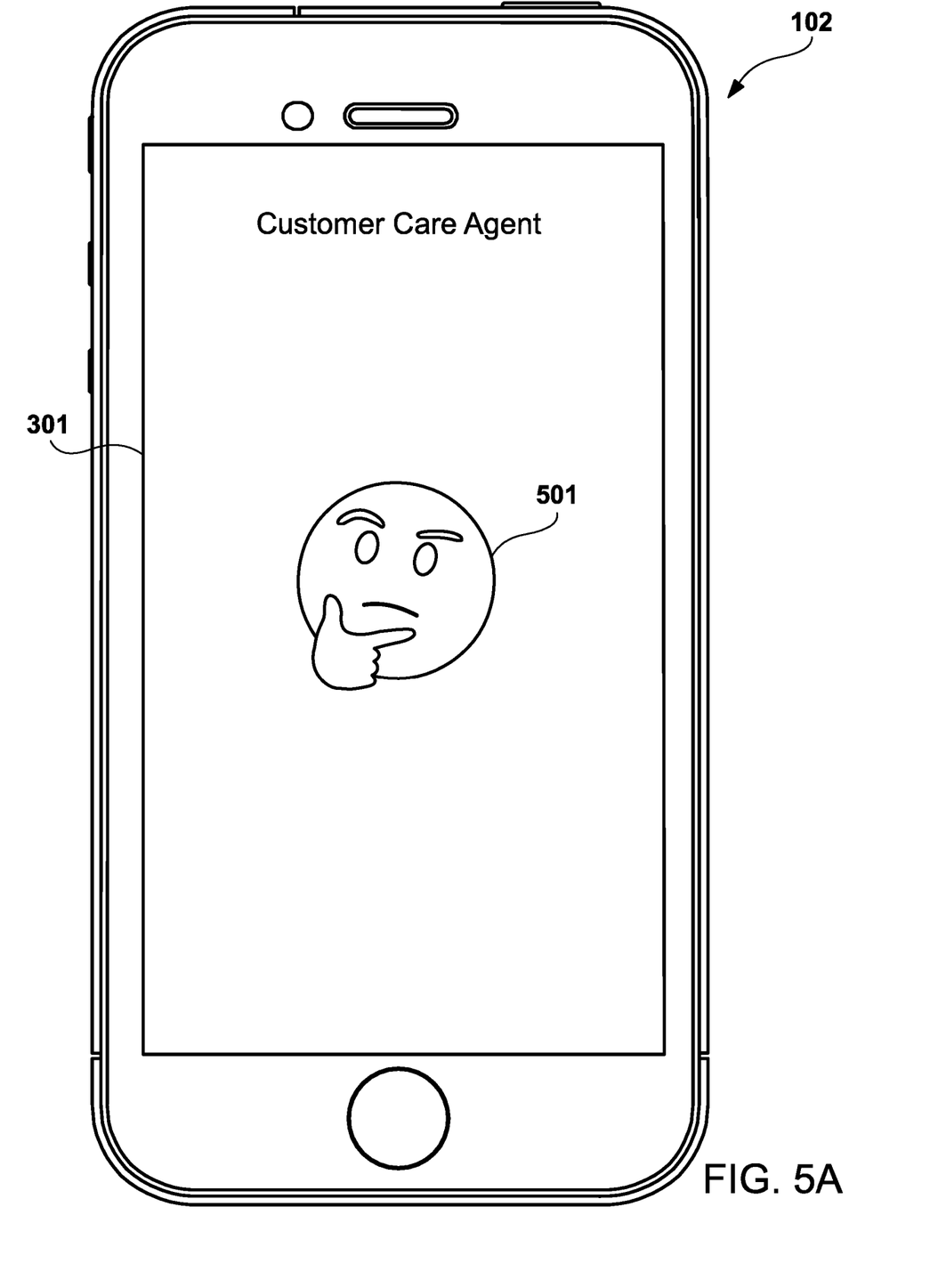
FIG. 5A illustrates an emoji having a lip movement corresponding to the translated response in the language of the LEP user.
Figure 5B:
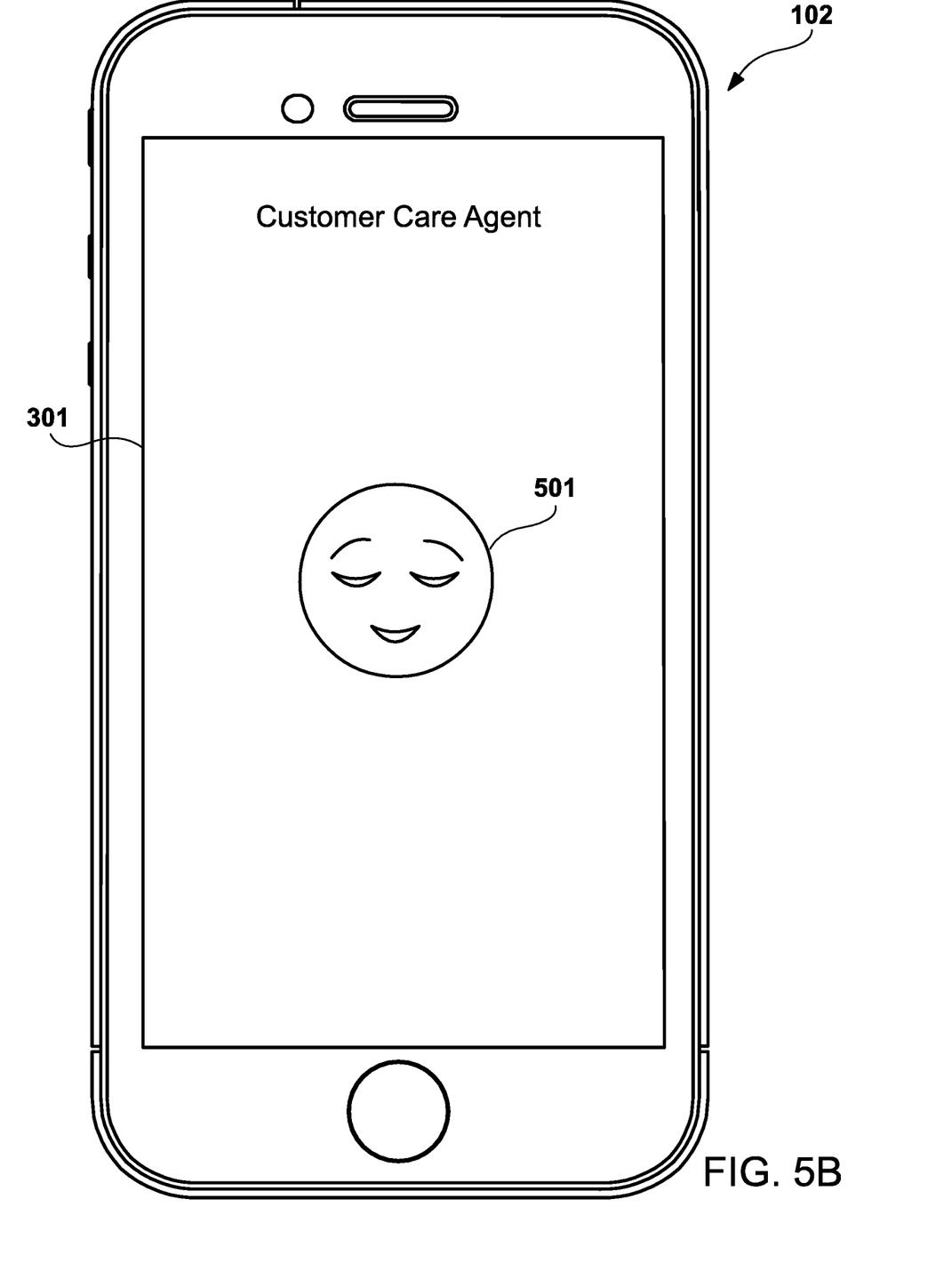
FIG. 5B illustrates an image-based manipulation of the emoji illustrated in FIG. 5B.

Moreover, FIGS. 5A and 5B illustrate an example of an emoji 501 that is displayed during the communication between the LEP user 101 and the customer care representative 104 illustrated in FIG. 1. For example, the LEP user 101 may have a favorite emoji that the LEP user 101 prefers to view during the communication with the customer care representative 104. Accordingly, the LEP user 101 may enjoy an entertaining user experience when speaking with the customer care representative 104. In one embodiment, a menu of available emoji is provided to the display-based device 102 for the LEP user 101 to select from. In another embodiment, the LEP user 102 provides transmits a preferred emoji, which was previously stored on the display-based device 102, to the customer care center platform 103. In the example provided in FIG. 5A, the emoji 502 has a lip movement corresponding to the translated response in the language of the LEP user 101. Further, FIG. 5B illustrates an image-based manipulation of the emoji 501 illustrated in FIG. 5B.

The imagery illustrated in FIGS. 3A-5B is solely directed to representations associated with the customer care representative 104 and/or customer care center 103. In other words, only the LEP user 101 views such representations, and the customer care representative 104 listens to the voice of the LEP user 101. In another embodiment, the imagery of both the customer care representative 104 and the LEP user 102 are provide to each other. For example, an emoji 501 associated with the customer care agent 104 may be displayed by the display-based device 102 of the LEP user 102, whereas an additional emoji of the LEP user 102 may be displayed by a display device viewed by the customer care representative 104; each emoji would have corresponding audio insertion and imagery manipulation. In yet another embodiment, a split screen may be displayed by the display-based device 102 and/or display-based device utilized by the customer care representative, whereby each portion of the display screen displays respective imagery so that each speaker can view associated imagery of himself or herself during the communication, in addition to the imagery associated with the other participant. Accordingly, the configurations provided for herein may be used to provide video remote interpretation ("VRI") experience without showing actual video/image captures of the participants.

Figure 6:
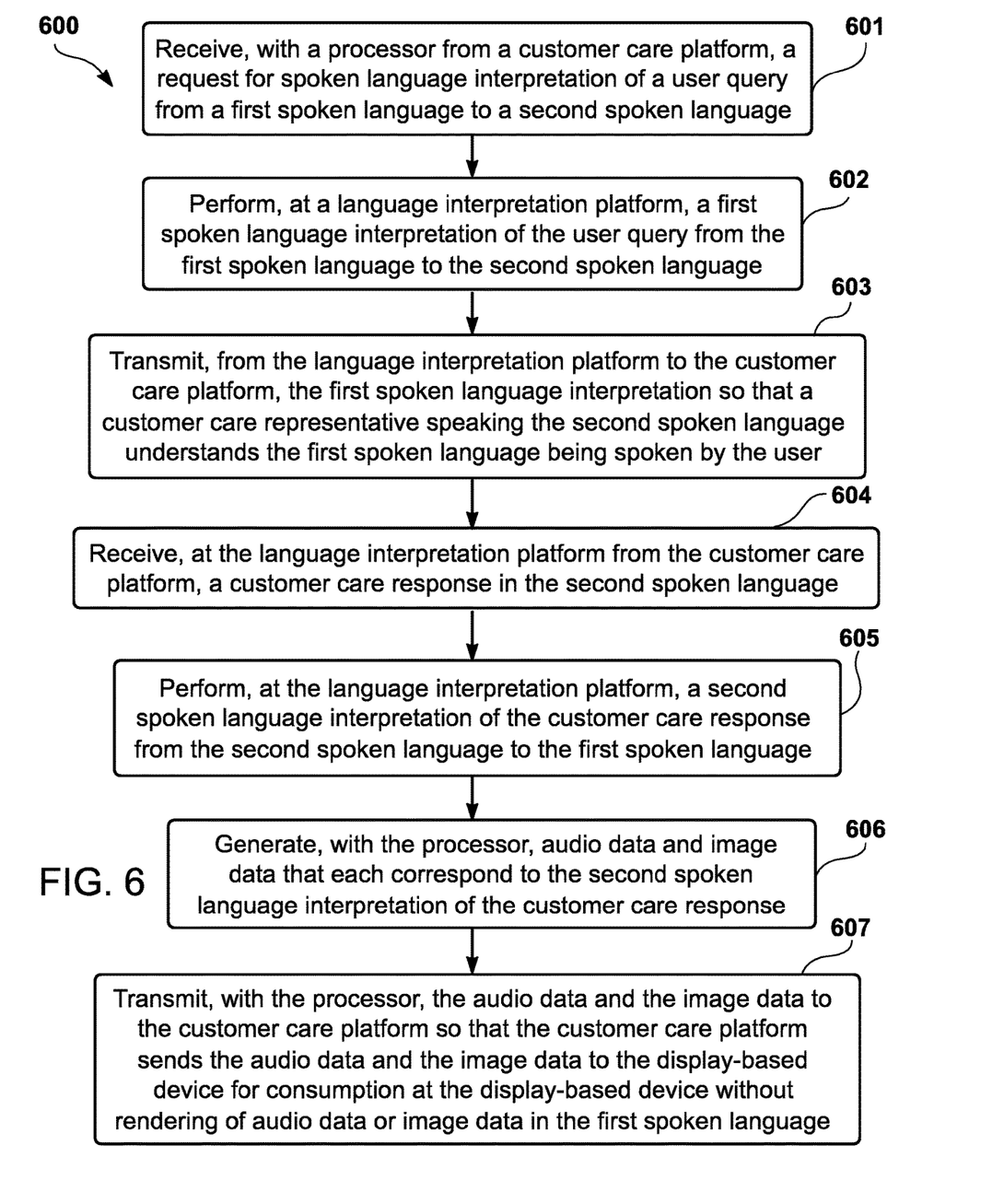
FIG. 6 illustrates a process that may be used to perform remote multi-channel language interpretation via imagery and corresponding audio.

FIG. 6 illustrates a process 600 that may be used to perform remote multi-channel language interpretation via imagery and corresponding audio. At a process block 601, the process 600 receives, with the processor 201 (FIG. 2) from the customer care platform (FIG. 1), a request for spoken language interpretation of a user query from a first spoken language to a second spoken language. The first spoken language is spoken by a user situated at a display-based device 102 that is remotely situated from the customer care platform 103. The user query is sent from the display-based device 102 by the user 101 to the customer care platform 103.

Further, at a process block 602, the process 600 performs, at the language interpretation platform 107 (FIG. 1), a first spoken language interpretation of the user query from the first spoken language to the second spoken language. Moreover, at a process block 603, the process 600 transmits, from the language interpretation platform 107 to the customer care platform 103, the first spoken language interpretation so that a customer care representative 104 speaking the second spoken language understands the first spoken language being spoken by the user 101.

Additionally, at a process block 604, the process 600 receives, at the language interpretation platform 107 from the customer care platform 103, a customer care response in the second spoken language. Also, at a process block 605, the process 600 performs, at the language interpretation platform 107, a second spoken language interpretation of the customer care response from the second spoken language to the first spoken language. Moreover, at a process block 606, the process 600 generates, with the processor 201, audio data and image data that each correspond to the second spoken language interpretation of the customer care response. Finally, at a process block 607, the process 600 transmits, with the processor 201, the audio data and the image data to the customer care platform 103 so that the customer care platform 103 sends the audio data and the image data to the display-based device 102 for consumption at the display-based device 102 without rendering of audio data or image data in the first spoken language.

A computer is herein intended to include any device that has a general, multi-purpose or single purpose processor as described above. For example, a computer may be a PC, laptop computer, set top box, cell phone, smartphone, tablet device, smart wearable device, portable media player, video player, etc.

It is understood that the apparatuses described herein may also be applied in other types of apparatuses. Those skilled in the art will appreciate that the various adaptations and modifications of the embodiments of the apparatuses described herein may be configured without departing from the scope and spirit of the present computer apparatuses. Therefore, it is to be understood that, within the scope of the appended claims, the present apparatuses may be practiced other than as specifically described herein.

We claim:

1. A computer program product comprising a computer readable storage device having a computer readable program stored thereon, wherein the computer readable program when executed on a computer causes the computer to:

receive, with a processor from a customer care platform, a request for spoken language interpretation of a user query from a first spoken language to a second spoken language, the first spoken language being spoken by a user situated at a display-based device that is remotely situated from the customer care platform, the user query being sent from the display-based device by the user to the customer care platform;

perform, at a language interpretation platform, a first spoken language interpretation of the user query from the first spoken language to the second spoken language;

transmit, from the language interpretation platform to the customer care platform, the first spoken language interpretation so that a customer care representative speaking the second spoken language understands the first spoken language being spoken by the user, the customer care representative positioned at an additional display device that is remotely situated from the user;

receive, at the language interpretation platform from the customer care platform, a customer care response in the second spoken language;

perform, at the language interpretation platform, a second spoken language interpretation of the customer care response from the second spoken language to the first spoken language;

generate, with the processor, audio data and image data that each correspond to the second spoken language interpretation of the customer care response;

transmit, with the processor, the audio data and the image data to the customer care platform so that the customer care platform sends the audio data and the image data to the display-based device for consumption at the display-based device without rendering of audio data or image data in the first spoken language, wherein the image data corresponds to an avatar of a non-human brand-associated character; and generate a synchronized animation by manipulating the avatar of the non-human brand-associated character to correspond with the audio data.

2. The computer program product of claim 1, wherein the synchronized animation is selected from the group consisting of: lip synchronization and gesture synchronization.

3. The computer program product of claim 1, wherein the computer is further caused to retrieve, from one or more database, a sequence of the image data that corresponds to the audio data.

4. The computer program product of claim 1, wherein the first spoken language interpretation and the second spoken language interpretation are performed by a machine interpreter.

5. The computer program product of claim 1, wherein the first spoken language interpretation and the second spoken language interpretation are performed by a human interpreter.

6. A method comprising:

receiving, with a processor from a customer care platform, a request for spoken language interpretation of a user query from a first spoken language to a second spoken language, the first spoken language being spoken by a user situated at a display-based device that is remotely situated from the customer care platform, the user query being sent from the display-based device by the user to the customer care platform;

performing, at a language interpretation platform, a first spoken language interpretation of the user query from the first spoken language to the second spoken language;

transmitting, from the language interpretation platform to the customer care platform, the first spoken language interpretation so that a customer care representative speaking the second spoken language understands the first spoken language being spoken by the user, the customer care representative positioned at an additional display device that is remotely situated from the user;

receiving, at the language interpretation platform from the customer care platform, a customer care response in the second spoken language;

performing, at the language interpretation platform, a second spoken language interpretation of the customer care response from the second spoken language to the first spoken language;

generating, with the processor, audio data and image data that each correspond to the second spoken language interpretation of the customer care response;

transmitting, with the processor, the audio data and the image data to the customer care platform so that the customer care platform sends the audio data and the image data to the display-based device for consumption at the display-based device without rendering of audio data or image data in the first spoken language, wherein the image data corresponds to an avatar of a non-human brand-associated character; and generating a synchronized animation by manipulating the avatar of the non-human brand-associated character to correspond with the audio data.

7. The method of claim 6, wherein the synchronized animation is selected from the group consisting of: lip synchronization and gesture synchronization.

8. The method of claim 6, further comprising retrieving, from one or more database, a sequence of the image data that corresponds to the audio data.

9. The method of claim 6, wherein the first spoken language interpretation and the second spoken language interpretation are performed by a machine interpreter.

10. The method of claim 6, wherein the first spoken language interpretation and the second spoken language interpretation are performed by a human interpreter.

* * * * *